United States Patent [19]
Dejneka

[11] Patent Number: 5,955,388
[45] Date of Patent: Sep. 21, 1999

[54] TRANSPARENT OXYFLOURIDE GLASS-CERAMIC COMPOSITION AND PROCESS OF MAKING

[75] Inventor: Matthew John Dejneka, Corning, N.Y.

[73] Assignee: Corning Incorporated, Corning, N.Y.

[21] Appl. No.: 08/944,932

[22] Filed: Oct. 2, 1997

Related U.S. Application Data

[60] Provisional application No. 60/034,472, Jan. 2, 1997.

[51] Int. Cl.$^6$ ............................. C03C 10/16; C03C 3/04
[52] U.S. Cl. ............................. 501/3; 501/37; 501/43; 501/57; 501/58; 501/59; 501/73; 501/78; 65/385; 65/386; 65/33.3
[58] Field of Search .................. 501/3, 37, 43, 501/57, 58, 59, 73, 78; 65/385, 386, 33.3

[56] References Cited

U.S. PATENT DOCUMENTS

| | | | |
|---|---|---|---|
| 3,709,827 | 1/1973 | Auzel | 501/3 |
| 4,032,351 | 6/1977 | Auzel et al. | 501/3 |
| 5,420,080 | 5/1995 | Wang et al. | 501/3 |
| 5,483,628 | 1/1996 | Borrelli et al. | |
| 5,545,595 | 8/1996 | Wang et al. | 501/3 |

FOREIGN PATENT DOCUMENTS

| | | |
|---|---|---|
| 0 640 571 A1 | 3/1995 | European Pat. Off. |
| 0 739 863 A1 | 10/1996 | European Pat. Off. |

OTHER PUBLICATIONS

Yuhu Wang et al., "New transparent vitroceramics codoped with Er3+ and Yb3+ for efficient frequency upconversion", Applied Physics Letters, vol. 63, No. 24, Dec. 13,.1993, pp. 3268–3270, P000416520.
Hirako, K et al., "Study of Er/sup 3+/–doped upconversion glass", Physics of Non–Crystalline Solids, Cambridge, UK, Aug. 4–9, 1991, ISBN 0–7484–0050–8, 1992, London, UK, Taylor & Francis, UK, pp. 611–616, XP002062253.
B. Reddy et al. Appl. Phys. 76 (6) 3896 (1994).
M. Weber, J. Chem. Phys. 48 4774 (1968).
C. Chinnock, Laser Focus World 30 n11 28 (1994).
M. Weber. Phys. Rev. 157 262 (1967).
W. Carnall et al. J. Chem. Phys. 90 (97) 3443 (1989).
B. Reddy et al. J. Opt. Soc. Am. B 11 (5) 923 (1994).
M. Dubinskii et al. J. Opt. Soc. Am B 9 (6) 1148 (1992).
M. Dubinskii et al. Optics Comm. 88 122 (1992).
T. Fan et al. IEEE J. Quant. Elec. 25 (8) 1845 (1989).
T. Mossberg Optics Lett. 17 (7) 535 (1992).
J. Zhang et al. Phys. Rev. B 48 (10) 7668 (1993).

Primary Examiner—Karl Group
Attorney, Agent, or Firm—William Greener

[57] ABSTRACT

A transparent class ceramic composition includes an oxide component, a rare earth component, a halide component, and a substantially pure rare earth-halide (e.g., $REF_3$) crystal component. A method for making a transparent oxyfluoride glass includes preparing an oxyfluoride glass containing rare earth ions by a conventional melting method and subjecting the glass to a heat treatment thereby precipitating fluoride fine crystals containing a large amount of rare earth ions.

15 Claims, 3 Drawing Sheets

TRANSPARENT OXYFLOURIDE GLASS-CERAMIC COMPOSITION AND PROCESS OF MAKING

This application claims the benefit under 35 USC §119(e) of U.S. Provisional Application No. 60/034,472 filed Jan. 2, 1997.

BACKGROUND OF THE INVENTION

1. Field of the Invention

This invention relates to a new transparent oxyfluoride glass ceramic composition and to a method for making said composition. The glass composition of the present invention is subject to a wide range of applications but is especially suited for optical devices, including but not limited to planar and fiber configurations thereof, providing optical amplification in the 1.3 micron and 1.55 micron telecommunication windows, lasers, 3-D displays, and various wavelength up-conversion applications.

2. Description of Related Art

Traditional oxide glasses conventionally used in optical amplifier applications, for example, derive their light amplifying properties via stimulated emission of rare earth (RE) element ions doped in the glass. Both the fluorescence lifetime of the dopant ions and the dopant density largely affect the light amplification properties of the glass. The maximum useable concentration of rare earth ions in a glass host, however, is limited by concentration quenching. Concentration quenching is due to the nonradiative decay of excited rare earth ions which are too close to their neighboring unexcited rare earth ions. Excited rare earth ions will transfer energy to closely neighboring nonexcited rare earth ions through dipole-dipole coupling, resulting in phonon, instead of photon, transitions. Increasing the concentration of rare earth ions in the glass host causes clustering of the rare earth ions with neighboring rare earth ions which reduces the fluorescence lifetime of the rare earth energy levels. Excited levels can also be quenched by phonon coupling to the host matrix. For example, the $^1G_4$ level of $Pr^{3+}$ is severely quenched in high phonon energy glasses like silicates; but in low phonon energy hosts such as halide and chalcogenide glasses and crystals, emission from the $^1G_4$ level of $Pr^{3+}$ can be used for 1.3 $\mu$m amplification.

Fluoride glasses and crystals are desirable hosts for optically active ions because of their broad transparency, low phonon energy, and high rare earth solubility. They are, however, difficult to process because they require a controlled atmosphere for batching and melting. Moreover, fluoride glasses are difficult to draw into fiber and cannot be used for large optics due to instability of the glass. Single crystal fluorides produce narrow fluorescence line widths, but cannot be fiberized and are costly to produce.

Conventional oxyfluoride glass ceramics offer economic and performance alternatives with substantial improvements over pure oxide and fluoride glasses. For example, they can be melted in ambient atmospheres and processed by conventional glass forming methods. They provide the durability and mechanical properties of oxide glasses while offering a fluoride environment for rare earth dopants. In addition, there exists the possibility of orienting the crystals by plastic deformation of the body after ceramming for polarizing effects. However, limited rare earth solubility and clustering continue to be problematic in current oxyfluoride glass ceramic compositions.

The inventor has thus recognized a need for a glass composition that provides the stability and workability of traditional oxide glass compositions, the performance characteristics offered by fluoride glass compositions, and which accommodates high rare earth doping concentrations.

SUMMARY OF THE INVENTION

Accordingly, the invention is directed to a composition and a method for providing such a composition. Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve these and other advantages and in accordance with the purpose of the invention, as embodied and broadly described, the invention describes a new transparent oxyhalide (e.g., oxyfluoride) glass-ceramic. The new composition is produced by heat treating a conventional $Na_2O$—$Al_2O_3$—$SiO_2$ (NAS) base glass composition loaded with $REF_3$, where RE refers to the trivalent lanthanides. Ceramming the composition has the beneficial effect of causing optically active rare earth dopants incorporated therein to partition into $REF_3$ crystallites having diameters of about 10–20 nm, in the glass, resulting in high optical transparency in the wavelength regions of interest, long fluorescence lifetimes (e.g., 280 $\mu$s for $Pr^{3+}$ for the $^1G_4$ transition), and emission spectra typical of heavy halide crystals, as shown in FIG. 2($a$). Moreover, $REF_3$ was found to be an ideal host for a variety of rare earth ions because of its broad wavelength transparency; low phonon energy; enormous rare earth solubility resulting in, e.g., $Pr^{3+}$ 1.3 $\mu$m fluorescent efficiencies two to three times better than ZBLAN (an exemplary composition in mole % being $53ZrF_4$—$20BaF_2$—$4LaF_3$—$3AlF_3$—$20NaF$) and e.g., $Er^{3+}$ 1.55 $\mu$m fluorescent efficiencies better than silica with 50 times the erbium concentration; and gain flattening (at 1.55 $\mu$m for $Er^{3+}$) characteristics. The NAS-$REF_3$ glass ceramics according to the embodiments described herein provide promising materials for 1.3 $\mu$m optical amplifiers (planar and fiber configurations), offering both better performance and simpler processing over fluoride glass competitors. The observed long $Pr^{3+}$ lifetimes also make the inventive composition a strong candidate for new 3-D full color display technologies based upon $Pr^{3+}$ upconversion. The high rare earth solubility and long $Er^{3+}$ lifetimes in the $REF_3$ crystals provide high potential for 1.55 $\mu$m amplification via planar and fiber optical amplifiers, and various upconversion laser sources as well as for 3-D displays. In addition, various other ions offer potential advantages in $REF_3$ glass ceramics; e.g., $Nd^{3+}$ can be used for high power lasers in the IR and novel UV lasers, while the inventive compositions also serve as good hosts for optical memory devices based upon frequency-selective optical data storage.

A broadly transparent glass ceramic composition according to an embodiment of the invention includes an amorphous component and a crystal component. More specifically, the composition has an oxide component, a rare earth component, a halide component, and a substantially pure rare earth-halide ($REF_3$) crystal component. In an aspect of this embodiment, the composition contains up to 35% mole of the rare earth-halide crystal component as $REF_3$ (up to 18% as $RE_2F_6$). In another aspect of this embodiment, the rare earth-halide crystal component is an hexagonal fluoride. In another aspect of this embodiment, only some of the rare earth component is partitioned into the rare earth-halide crystal component.

Another embodiment of the invention describes an oxyfluoride glass having the following essential composition (in respective % mole amounts):

| | |
|---|---|
| $SiO_2$ | (0–80); |
| $GeO_2$ | (0–80); |
| $Na_2O$ | (0–25); |
| $K_2O$ | (0–25); |
| $Rb_2O$ | (0–25); |
| $Cs_2O$ | (0–25); |
| $Al_2O_3$ | (0–40); |
| $Ga_2O_3$ | (0–40); |
| $RE_2F_6$ | (0 < $RE_2F_6$ < 18); |
| PbO | (0–15); |
| RO | (0–25); |
| ZnO | (0–10); |
| $ZrO_2$ | (0–2); |
| $TiO_2$ | (0–2); |
| $Nb_2O_5$ | (0–10); |
| $Ta_2O_5$ | (0–10); |
| $P_2O_5$ | (0–5); |
| $B_2O_3$ | (0–15); |
| $As_2O_3$ | (0–10); |
| $Sb_2O_3$ | (0–10); and |
| $XCl_n$ | (0–5), | where RO is at least one of BaO, CaO, SnO and MgO;

$XCl_n$ is a chlorine containing component such as NaCl, $LaCl_3$, $AlCl_3$, or $NH_4Cl$; with ($SiO_2$+$GeO_2$) (40–80);

($Na_2O$+$K_2O$+$Rb_2O$+$Cs_2O$) (2–25); and ($Al_2O_3$+$Ga_2O_3$) (10–40), where RE is one or more, alone or in combination, of $Y^{3+}$, $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$. In an aspect of this embodiment, the amount of $RE_2F_6$ is selected according to the formula: $RE_2F_6 = (K')(R'/r)^3 \ (Al_2O_3+Ga_2O_3-R_2O)/2$, where R is one of Na, K, Rb and Cs; $0.7 \leq K' \leq 1.2$; R' is the radius of $La^{3+}$; and r is the radius of the $RE^{3+}$.

In another embodiment the invention contemplates a process for the production of a transparent oxyfluoride glass ceramic containing rare earth fluoride crystals, having the above noted composition, by carrying out the steps of: a) combining mixable forms of each component of the composition to form a mixture thereof; b) charging the mixture into a crucible; c) melting the mixture; d) promoting homogenization of the melt; e) casting the melt into a mold to quench the glass to a vitreous state; and f) heat treating the glass to promote the formation of fine rare earth fluoride crystals. In an aspect of this embodiment, the glass is heat treated at between 600–800° C. for 1–48 hours. In another aspect of this embodiment, the glass is heat treated at between 675–725° C. for 3–4 hours.

It is to be understood that both the foregoing general description and the following detailed description are exemplary and are intended to provide further explanation of the invention as claimed.

The accompanying drawings are included to provide a further understanding of the invention and are incorporated in and constitute a part of this specification, illustrate embodiments of the invention and together with the description serve to explain the principles of the invention.

DETAILED DESCRIPTION OF A PREFERRED EMBODIMENT OF THE INVENTION

Figure 1:
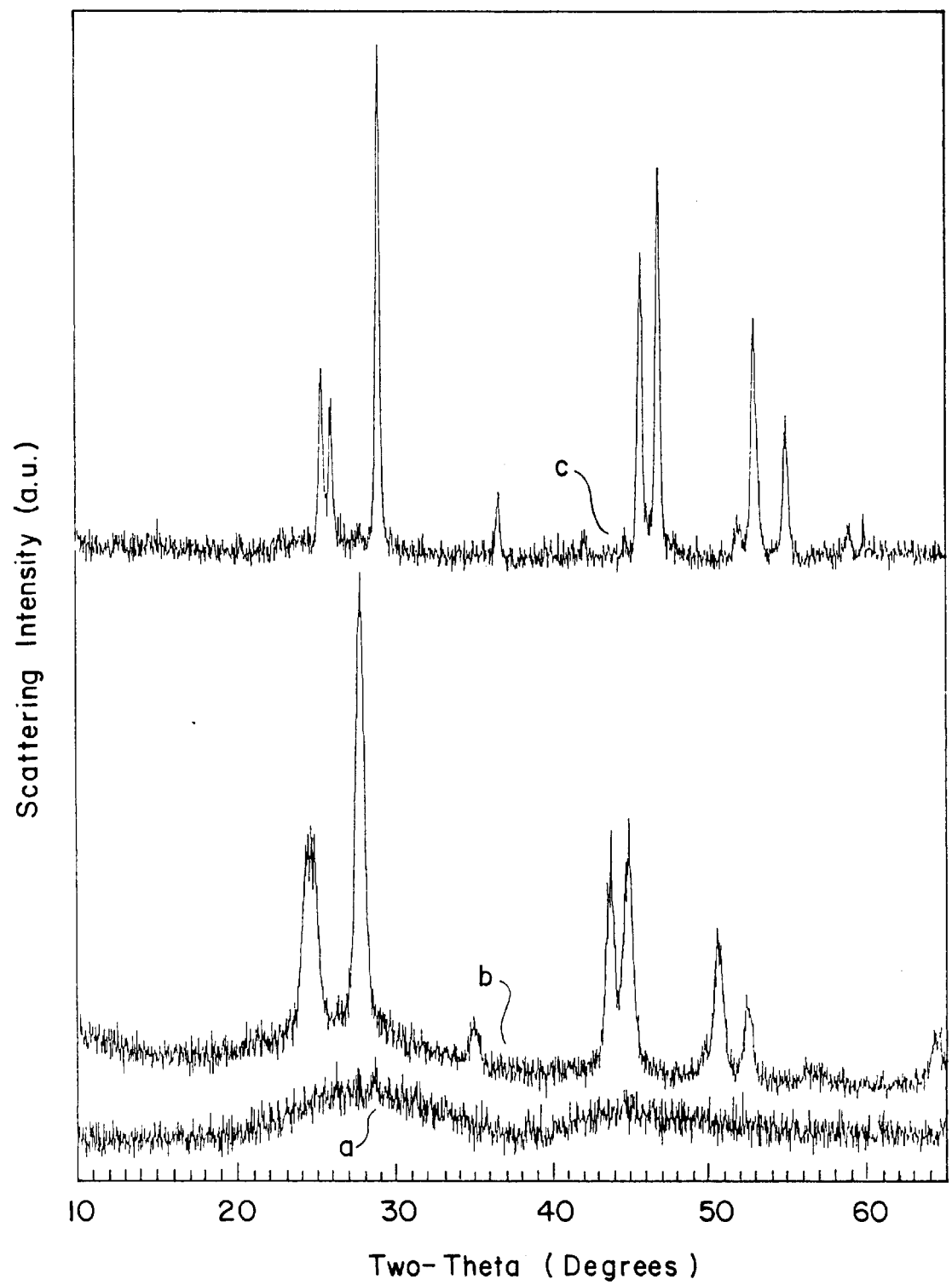
FIG. 1(a) is an X-ray diffraction pattern of an untreated exemplary glass composition according to an embodiment of the invention.
FIG. 1(b) is an X-ray diffraction pattern of the same glass composition as in FIG. 1(a) after it was heat treated, showing peaks indicative of hexagonal $LaF_3$ crystals.
FIG. 1(c) is an X-ray diffraction pattern of another exemplary glass composition according to an embodiment of the invention after it was heat treated, showing peaks indicative of hexagonal $GdF_3$ crystals.

The invention describes a new oxyhalide glass ceramic composition and a method for making the new composition.

Reference will now be made in detail to the present preferred embodiments of the invention, examples of which are illustrated in the accompanying drawings and tables presented herein.

In a preferred embodiment of the invention, an oxyfluoride glass composition has the essential constituent ranges given below:

| | |
|---|---|
| $SiO_2$ | (0–80); |
| $GeO_2$ | (0–80); |
| $Na_2O$ | (5–14); |
| $K_2O$ | (0–14); |
| $Rb_2O$ | (0–14); |
| $Cs_2O$ | (0–14); |
| $Al_2O_3$ | (15–30); |
| $Ga_2O_3$ | (0–15); |
| $RE_2F_6$ | (2–12); |
| PbO | (0–15); |
| RO | (0–25); |
| ZnO | (0–10); |
| $ZrO_2$ | (0–2); |
| $TiO_2$ | (0–2); |
| $Nb_2O_5$ | (0–10); |
| $Ta_2O_5$ | (0–10); |
| $P_2O_5$ | (0–5); |
| $B_2O_3$ | (0–15); |
| $As_2O_3$ | (0–10); |
| $Sb_2O_3$ | (0–10); and |
| $XCl_n$ | (0–5), | where RO is at least one of BaO, CaO, SnO and MgO;

$XCl_n$ is a chlorine containing component such as NaCl, $LaCl_3$, $AlCl_3$, or $NH_4Cl$; with ($SiO_2$+$GeO_2$): (50–80);

($Na_2O$+$K_2O$+$Rb_2O$+$Cs_2O$): (3–20); and ($Al_2O_3$+$Ga_2O_3$): (15–35), where RE is selected from the group of at least one of the rare earth lanthanides consisting of $Y^{3+}$, $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, or a combination thereof; and $XCl_n$ is a chlorine containing component such as NaCl, $LaCl_3$, $AlCl_3$, or $NH_4Cl$.

The chemical composition of the glass is critical to achieve a transparent glass ceramic and can be varied over a large range to engineer both physical and optical properties for the specific application. $SiO_2$ is the main glass former, with greater $SiO_2$ levels leading to greater glass stability, viscosity, and ceramming temperature, while decreasing the coefficient of thermal expansion, refractive index, density, and liquidus temperature. As in most optical glasses, $GeO_2$ has the same role as $SiO_2$ and can be substituted for $SiO_2$ to increase the index of refraction.

All of the alkali oxides except $Li_2O$ behave similarly and can be substituted for one another. $Li_2O$ causes spontaneous crystallization of RE fluoride crystals if it is substituted equally for any of the other alkalis. The exemplary compositions listed herein have ($Al_2O_3+Ga_2O_3$) in excess of total alkali oxides $R_2O$, so an increase in alkali content leads to an increase in viscosity, glass stability, thermal expansion, and softening of the glass as the $R_2O/Al_2O_3$ ratio increases towards unity. However, an increase in total $R_2O$ also leads to a decrease in total RE fluoride solubility, so a balance must be maintained between properties and required RE content.

The total RE fluoride level should be close to saturation to obtain best transparency and is given approximately by the equation $RE_2F_6=(K')(R'/r)^3$ $(Al_2O_3+Ga_2O_3-R_2O)/2$, where R is one of Na, K, Rb, and/or Cs; $0.7 \leq K' \leq 1.2$; R' is the radius of $La^{3+}$; and r is the radius of $RE^{3+}$. Much more RE fluoride will cause spontaneous crystallization and much less will produce opaque glass ceramics or stable glasses that do not ceram at all. The fluorine concentration is also critical for producing transparent glass ceramics. Fluorine levels at or slightly above stoichiometric $RE_2F_6$ will produce good transparency and good conversion of $RE^{3+}$ in the glass to crystalline $RE_2F_6$. Fluorine deficient samples will form translucent or even opaque opals while greater fluorine levels will cause spontaneous crystallization. Between 2% and 50% of the batched fluorine can be lost during melting depending on composition, fluorine source, and melting time and temperature. Crucible lids, low humidity, dry batch materials, and low melting temperatures help minimize these losses. The fluorine can be batched as $AlF_3$, $REF_3$, $NH_5F_2$, $NaF$, $Na_2SiF_6$, $Na_3AlF_6$ or most any other fluorinated component of the composition. Regardless of the fluorine source, the crystal phase will be the RE fluoride since it is the most stable fluoride phase in the inventive system.

The total $Al_2O_3+Ga_2O_3$ content is key to maintaining high RE fluoride solubility as shown above, and can also be used to control the physical properties. Greater $Al_2O_3+Ga_2O_3$ contents will increase total RE fluoride solubility, thus greater RE fluoride levels will be necessary to maintain transparency. Therefore the conglomerate increase in $Al_2O_3+Ga_2O_3+RE_2F_6$ at the expense of total $R_2O$ will decrease thermal expansion, viscosity, glass stability, and glass transition temperature while it will increase density, refractive index, and the amount of RE fluoride crystals that can be precipitated in the glass. Increasing $Ga_2O_3$ for $Al_2O_3$ can be used to increase the refractive index of the glass.

Figure 2:
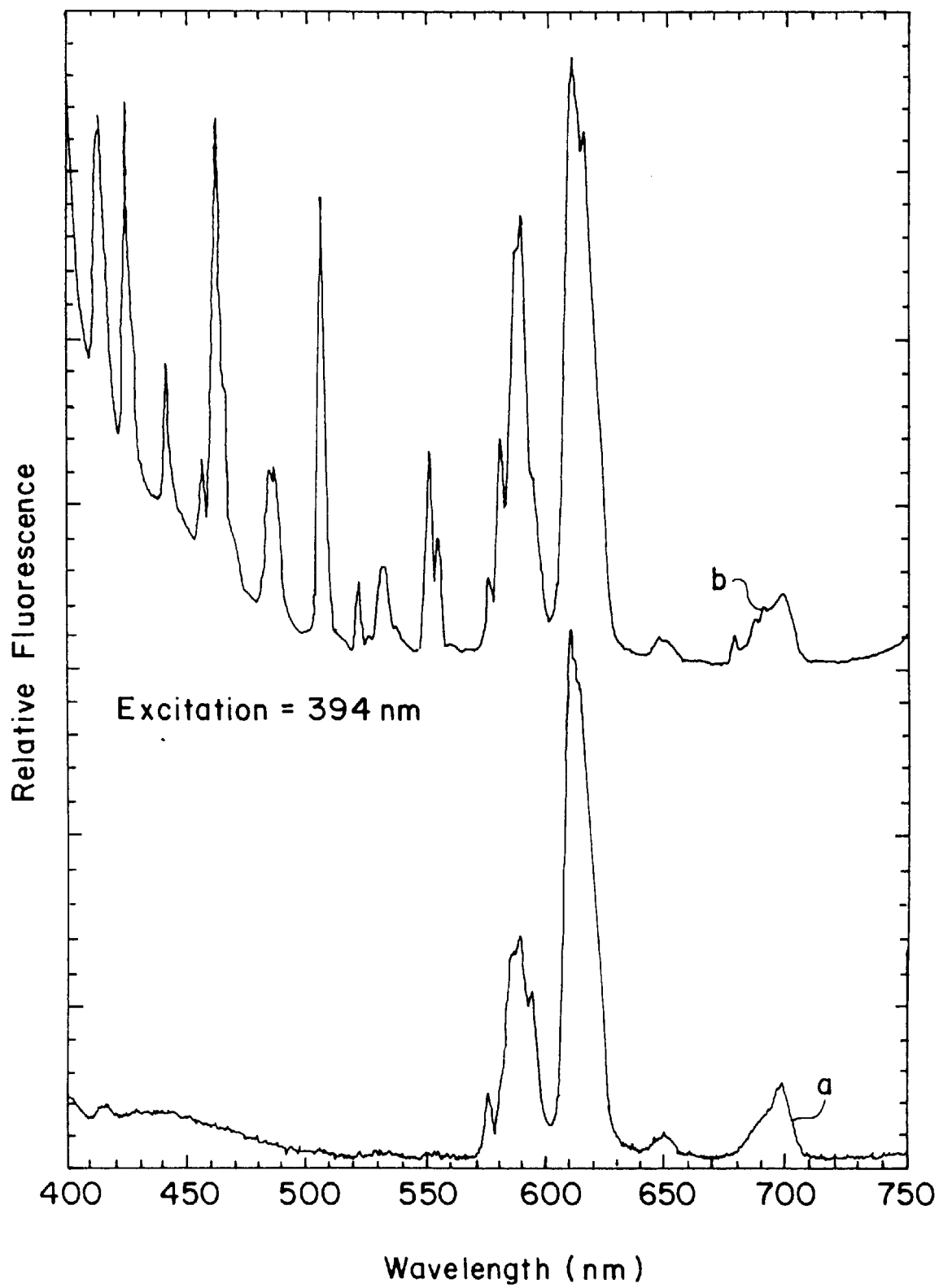
FIG. 2(a) shows the $Eu^{3+}$ fluorescence spectrum from an untreated exemplary glass composition according to an embodiment of the invention.
FIG. 2(b) shows the $Eu^{3+}$ fluorescence spectrum from the same glass composition as in FIG. 2(a) after it was heat treated.

Almost any RE can be incorporated into the glass. Optically active RE's ($Ce^{3+}$, $Pr^{3+}$, $Nd^{3+}$, $Pm^{3+}$, $Sm^{3+}$, $Eu^{3+}$, $Tb^{3+}$, $Dy^{3+}$, $Ho^{3+}$, $Er^{3+}$, $Tm^{3+}$, or $Yb^{3+}$, and optically inert RE's ($Y^{3+}$, $La^{3+}$, or $Gd^{3+}$) can be crystallized alone or in any combination or solid solution. Pure active RE fluoride crystals such as $NdF_3$ (Table II, e.g. 10) can be precipitated to produce a transparent glass ceramic. Doped crystals such as $Er^{3+}$ doped $LaF_3$ can also be produced (Table I, e.g. 2). The amount of dopant in the crystal can be controlled by composition and heat treatment. The smaller the ionic radius of the rare earth ion, the less apt it will be to partition into the crystal and the more likely it is to stay behind in the glass upon ceramming. Long fluorescent lifetimes (280 µs $Pr^{3+1}$ $G_4$ and 12 ms $Er^{3+4}I_{13/2}$) and fluorescence measurements such as shown in FIG. 2. illustrate that active RE ions can be uniformly incorporated into the host low phonon energy inert RE fluoride crystal without clustering. This is imperative for efficient fluorescence, amplification, and laser oscillation. It is also by design, since the RE fluoride crystals show solid solution and by definition the solute phase in a solid solution will be well dispersed in the solvent phase as long as the limits of solid solution are not exceeded. It is possible to tailor the crystal environment in the inventive system to alter the active RE emission by co-doping with other RE ions. For example, $Er^{3+}$ can be sensitized by co-doping with $Yb^{3+}$ to enhance the absorption of pump energy (Table II, e.g. 19). The lattice spacing of the host crystal can also be altered by co-doping as is the case with a $LaF_3$—$GdF_3$—$YF_3$ host crystal (Table II, e.g. 1) doped with an active RE ion to change the active ion's emission line shape and peak emission wavelength.

PbO can be substituted for $R_2O$ in a ratio of about 3:2 PbO:$R_2O$ to increase the refractive index of the base glass without changing the RE fluoride solubility. In composition (Table I, e.g. 8) the PbO content is high enough to raise the refractive index from 1.55 for the base glass without PbO to 1.59 which matches the refractive index of the $LaF_3$ crystal, 1.59, to maximize transparency. PbO also lowers the liquidus of the glass. BaO, ZnO, $ZrO_2$, $TiO_2$, $Nb_2O_5$, and $Ta_2O_5$ can also be added to the glass the increase the refractive index without significantly degrading the transparency of the glass ceramic.

$B_2O_3$ can be added to decrease the density of the glass, but it also lowers the RE fluoride solubility, although not to the extent that the alkalis do. The usual fining agents, $As_2O_3$ and $Sb_2O_3$ can also be incorporated without altering the effectiveness of the material (see Table I, e.g.'s 19, 20). Chloride fining agents can also be used without ill effects (see Table I, e.g. 21).

Tables I and II, respectively, show exemplary base glass compositions containing basic $LaF_3$ host crystals, and various rare earth tri-fluoride containing compositions (all normalized to 100%, and all in mole % amounts), according to preferred embodiments of the invention.

TABLE I

| | BASE GLASS EXAMPLES | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| $SiO_2$ | 46.0 | 64.5 | 75.5 | 51.0 | 51.0 | 53.4 | 5.01 | 49.8 | 48.6 | 62.8 | 51.0 | 46.8 | 50.5 |
| $Na_2O$ | 12.3 | 5.5 | 3.8 | 0 | 5.6 | 17.5 | 11.2 | 6.5 | 4.4 | 4.5 | 0 | 10.7 | 11.1 |
| $K_2O$ | 0 | 0 | 0 | 11.1 | 0 | 0 | 0 | 0 | 0 | 0 | 0 | 0 | 0 |
| $Cs_2O$ | 0 | 0 | 0 | 0 | 5.6 | 0 | 0 | 0 | 0 | 0 | 0 | 0 | 0 |
| $Al_2O_3$ | 31.7 | 21.6 | 15.1 | 29.6 | 29.5 | 24.2 | 20.4 | 28.4 | 28.2 | 21.3 | 27.8 | 28.2 | 29.3 |
| $Ga_2O_3$ | 0 | 0 | 0 | 0 | 0 | 0 | 9.2 | 0 | 0 | 0 | 0 | 0 | 0 |

TABLE I-continued

BASE GLASS EXAMPLES

| | 3 | 10 | | | | | | | | | | | |
|---|---|---|---|---|---|---|---|---|---|---|---|---|---|
| $Al_2F_6$ | 0.9 | 0.5 | 0 | 0 | 0 | 1.0 | 9 | 0.5 | 0 | 0.3 | 1.7 | 0 | 0 |
| $La_2F_6$ | 9.1 | 7.5 | 5.1 | 8.3 | 8.3 | 3.8 | 8.3 | 8.1 | 7.9 | 7.2 | 8.3 | 7.9 | 8.2 |
| $Eu_2F_6$ | 0.05 | 0 | 0 | 0.05 | 0.05 | 0.05 | 0.05 | 0.05 | 0 | 0 | 0.05 | 0.04 | 0.05 |
| $Er_2F_6$ | 0 | 0.5 | 0.5 | 0 | 0 | 0 | 0 | 0 | 0 | 0.5 | 0 | 0 | 0 |
| PbO | 0 | 0 | 0 | 0 | 0 | 0 | 0 | 6.7 | 10.9 | 0 | 0 | 0 | 0 |
| BaO | 0 | 0 | 0 | 0 | 0 | 0 | 0 | 0 | 0 | 3.6 | 11.2 | 0 | 0 |
| ZnO | 0 | 0 | 0 | 0 | 0 | 0 | 0 | 0 | 0 | 0 | 0 | 4.4 | 0 |
| $ZrO_2$ | 0 | 0 | 0 | 0 | 0 | 0 | 0 | 0 | 0 | 0 | 0 | 0 | 0.9 |
| $TiO_2$ | 0 | 0 | 0 | 0 | 0 | 0 | 0 | 0 | 0 | 0 | 0 | 0 | 0 |
| $Nb_2O_5$ | 0 | 0 | 0 | 0 | 0 | 0 | 0 | 0 | 0 | 0 | 0 | 0 | 0 |
| $Ta_2O_5$ | 0 | 0 | −0 | 0 | 0 | 0 | 0 | 0 | 0 | 0 | 0 | 0 | 0 |
| $B_2O_3$ | 0 | 0 | 0 | 0 | 0 | 0 | 0 | 0 | 0 | 0 | 0 | 0 | 0 |
| $As_2O_3$ | 0 | 0 | 0 | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0 | 0 | 0 | 0 |
| NaCl | 0 | 0 | 0 | 0 | 0 | 0 | 0 | 0 | 0 | 0 | 0 | 0 | 0 |
| SiO2 | | | | | | | | | | | | | |
| Al2O3 | | | | | | | | | | | | | |
| La2F6 | | | | | | | | | | | | | |
| Eu2F6 | | | | | | | | | | | | | |
| MgO | | | | | | | | | | | | | |
| CaO | | | | | | | | | | | | | |
| SrO | | | | | | | | | | | | | |
| BaO | | | | | | | | | | | | | |

| | 14 | 15 | 16 | 17 | 18 | 19 | 20 | 21 | 22 | 23 | 24 | 25 |
|---|---|---|---|---|---|---|---|---|---|---|---|---|
| $SiO_2$ | 63.6 | 48.8 | 60.0 | 40.9 | 56.3 | 48.8 | 48.8 | 51.7 | | | | |
| $Na_2OS$ | 5.5 | 10.7 | 5.5 | 6.5 | 7.5 | 10.7 | 10.7 | 11.3 | | | | |
| $K_2O$ | 0 | 0 | 0 | 0 | 0 | 0 | 0 | 0 | | | | |
| $Cs_2O$ | 0 | 0 | 0 | 0 | 0 | 0 | 0 | 0 | | | | |
| $Al_2O_3$ | 22.1 | 28.2 | 22.1 | 28.4 | 20.7 | 28.3 | 28.3 | 28.1 | | | | |
| $Ga_2O_3$ | 0 | 0 | 0 | 0 | 0 | 0 | 0 | 0 | | | | |
| $10$ | | | | | | | | | | | | |
| $Al_2F_6$ | 0 | 0 | 0 | 0.4 | 0 | 0 | 0 | 0 | | | | |
| $La_2F_6$ | 7.4 | 7.9 | 7.4 | 7.7 | 5.6 | 7.9 | 7.9 | 7.0 | | | | |
| $Eu_2F_6$ | 0 | 0.04 | 0 | 0 | 0 | 0.04 | 0.04 | 0.05 | | | | |
| $Er_2F_6$ | 0.5 | 0 | 0.5 | 0.4 | 0.5 | 0 | 0 | 0 | | | | |
| PbO | 0 | 0 | 0 | 6.7 | 0 | 0 | 0 | 0 | | | | |
| BaO | 0 | 0 | 0 | 0 | 0 | 0 | 0 | 0 | | | | |
| ZnO | 0 | 0 | 0 | 0 | 0 | 0 | 0 | 0 | | | | |
| $ZrO_3$ | 0 | 0 | 0 | 0 | 0 | 0 | 0 | 0 | | | | |
| $TiO_3$ | 0.9 | 0 | 0 | 0 | 0 | 0 | 0 | 0 | | | | |
| $Nb_2O_5$ | 0 | 4.4 | 0 | 0 | 0 | 0 | 0 | 0 | | | | |
| $Ta_2O_5$ | 0 | 0 | 4.5 | 0 | 0 | 0 | 0 | 0 | | | | |
| $B_2O_3$ | 0 | 0 | 0 | 9.0 | 9.4 | 0 | 0 | 0 | | | | |
| $As_2O_3$ | 0 | 0 | 0 | 0 | 0 | 4.4 | 0 | 0 | | | | |
| $Sb_2O_3$ | 0 | 0 | 0 | 0 | 0 | 0 | 4.4 | 0 | | | | |
| NaCl | 0 | 0 | 0 | 0 | 0 | 0 | 0 | 1.9 | | | | |
| SiO2 | | | | | | | | | 69.77 | 70.09 | 70.09 | 70.09 |
| Al2O3 | | | | | | | | | 17.21 | 17.29 | 17.29 | 17.29 |
| La2F6 | | | | | | | | | 6.93 | 6.50 | 6.50 | 6.50 |
| Eu2F6 | | | | | | | | | 0.05 | 0.05 | 0.05 | 0.05 |
| MgO | | | | | | | | | 0.00 | 3.04 | 0.00 | 0.00 |
| CaO | | | | | | | | | 0.00 | 0.00 | 3.04 | 0.00 |
| SrO | | | | | | | | | 0.00 | 0.00 | 0.00 | 3.04 |
| BaO | | | | | | | | | 6.05 | 3.04 | 3.04 | 3.04 |

TABLE II $REF_3$ EXAMPLES

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| $SiO_2$ | 51.7 | 53.4 | 51.7 | 51.0 | 50.6 | 50.0 | 51.0 | 51.0 | 50.0 | 50.5 | 51.0 | 49.4 | 50.5 | 62.5 | 51.0 | 48.8 | 51.0 | 51.0 | 53.0 |
| $Na_2O$ | 13.2 | 17.5 | 13.2 | 11.2 | 11.1 | 6.5 | 11.2 | 11.2 | 6.5 | 13.0 | 11.2 | 6.4 | 13.0 | 6.3 | 11.2 | 12.5 | 11.2 | 11.2 | 6.9 |
| $Al_2O_3$ | 28.8 | 24.2 | 27.6 | 29.3 | 29.3 | 28.0 | 29.1 | 29.1 | 28.3 | 27.2 | 29.1 | 28.4 | 27.3 | 20.5 | 29.1 | 28.2 | 29.1 | 29.1 | 30.3 |
| $Al_2F_6$ | 1.3 | 1.0 | 0.5 | 0.2 | 0 | 0.8 | 0.5 | 0.5 | 0.4 | 0.3 | 0.5 | 0.2 | 0.2 | 0 | 0.5 | 0.1 | 0.5 | 0.5 | 0.4 |
| PbO | 0 | 0 | 0 | 0 | 0 | 6.7 | 0 | 0 | 6.7 | 0 | 0 | 7.0 | 0 | 0 | 0 | 0 | 0 | 0 | 0 |
| RE's | | | | | | | | | | | | | | | | | | | |
| $La_2F_6$ | 2.3 | 3B | 7.0 | 8.3 | 9.1 | 5.4 | 8.3 | 7.8 | 7.6 | 0 | 7.6 | 6.7 | 0 | 0 | 7.8 | 0 | 7.8 | 7.8 | 6.2 |
| $Ca_2F_5$ | 0 | 0 | 0 | 0 | 0 | 2.7 | 0 | 0 | 0 | 0 | 0 | 0 | 0 | 0 | 0 | 0 | 0 | 0 | 0 |
| $Pr_2F_5$ | 0 | 0 | 0 | 0 | 0 | 0 | 0.005 | 0.5 | 0 | 0 | 0 | 0 | 0 | 0 | 0 | 0 | 0 | 0 | 0 |
| $Nd_2F_5$ | 0 | 0 | 0 | 0 | 0 | 0 | 0 | 0 | 0.4 | 9.1 | 0 | 0 | 0 | 0 | 0 | 0 | 0 | 0 | 0 |

TABLE II-continued

| | REF₃ EXAMPLES | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| $Sm_2F_5$ | 0 | 0 | 0 | 0 | 0 | 0 | 0 | 0 | 0 | 0 | 0.5 | 0 | 0 | 0 | 0 | 0 | 0 | 0 | 0 |
| $Eu_2F_6$ | 0 | 0.05 | 0.05 | 0.05 | 0.05 | 0 | 0 | 0 | 0 | 0 | 0 | 2.2 | 0.05 | 0 | 0 | 0 | 0 | 0 | 0 |
| $Gd_2F_6$ | 2.3 | 0 | 0 | 0 | 0 | 0 | 0 | 0 | 0 | 0 | 0 | 0 | 9.0 | 0 | 0 | 0 | 0 | 0 | 0 |
| $Tb_2F_6$ | 0 | 0 | 0 | 0 | 0 | 0 | 0 | 0 | 0 | 0 | 0 | 0 | 0 | 10.7 | 0 | 0 | 0 | 0 | 0 |
| $Dy_2F_6$ | 0 | 0 | 0 | 0 | 0 | 0 | 0 | 0 | 0 | 0 | 0 | 0 | 0 | 0 | 0.5 | 0 | 0 | 0 | 0 |
| $Ho_2F_6$ | 0 | 0 | 0 | 0 | 0 | 0 | 0 | 0 | 0 | 0 | 0 | 0 | 0 | 0 | 0 | 0 | 0 | 0 | 0 |
| $Y_2F_6$ | 2.3 | 0 | 0 | 0 | 0 | 0 | 0 | 0 | 0 | 0 | 0 | 0 | 0 | 0 | 0 | 10.5 | 0 | 0 | 0 |
| $Er_2F_6$ | 0 | 0 | 0 | 0 | 0 | 0 | 0 | 0 | 0 | 0 | 0 | 0 | 0 | 0 | 0 | 0 | 0.5 | 0 | 0.5 |
| $Tm_2F_6$ | 0 | 0 | 0 | 0 | 0 | 0 | 0 | 0 | 0 | 0 | 0 | 0 | 0 | 0 | 0 | 0 | 0 | 0.5 | 0 |
| $Yb_2F_5$ | 0 | 0 | 0 | 0 | 0 | 0 | 0 | 0 | 0 | 0 | 0 | 0 | 0 | 0 | 0 | 0 | 0 | 0 | 2.9 |

Figure 3:
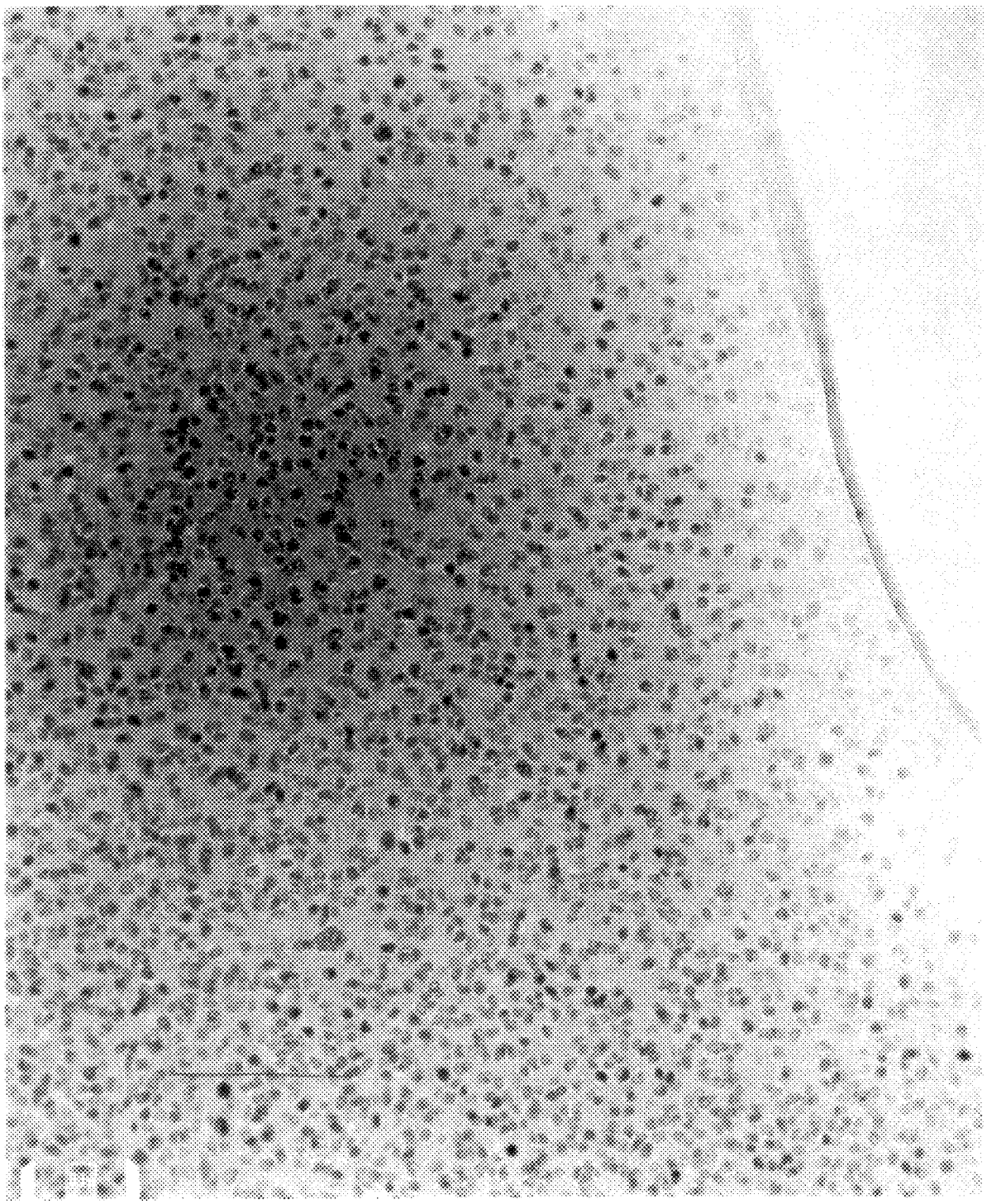
FIG. 3 is a reproduced transmission electron micrograph (200,000×) of an exemplary glass composition according to an embodiment of the invention after it was heat treated, showing fine, periodic $LaF_3$ crystallites having a diameter of about 120 Å.

In an embodiment of the invention, there is provided a process for the production of a novel transparent glass ceramic composition that comprises preparing an oxyfluoride glass containing rare earth ions by a conventional melting method well known to those skilled in the art, and subjecting the glass to a subsequent heat treatment (ceramming), thereby preferentially precipitating fine fluoride crystals containing a large amount of rare earth ions. Specifically, glass forming raw materials, e.g., powders of $SiO_2$, $Al_2O_3$, $NaNO_3$, $NaCO_3$, $AlF_3$, and rare earth oxides or trifluorides, preferably including lanthanides having atomic numbers in the range from 57–62, are mixed and charged into a crucible. The batch is then preferably uniformly melted at approximately 1500° C. for one to four hours while the melt is stirred or agitated to promote homogenization. The melt is then poured into a mold for forming or to quench the glass to a vitreous state. These steps substantially comprise the conventional process for the production of oxide glasses, and are used to obtain a transparent glass in various shapes. FIG. 1(a) shows the X-ray diffraction pattern of an untreated glass composition (Table II, e.g. 3) according to an embodiment of the invention. The resulting transparent glass is further heat treated for several hours, preferably for one to 48 hours at a temperature higher than the glass transition temperature, preferably between about 600° C. to 800° C., and more preferably at about 675–725° C. for about four hours. This process promotes the formation of the rare earth halide crystals described herein. Specifically, heat treatment of the glass induces crystallization of very small rare earth fluoride crystals from the glass. FIG. 1(b) shows the X-ray diffraction pattern for the same glass composition as in FIG. 1(a) after the glass was heat treated at 600° C. for 48 hours. The peaks are indicative of hexagonal $LaF_3$ crystals. Quantitative X-ray diffraction analysis based upon the integrated peak areas versus known standards indicates that up to 70% of the available rare earth can be incorporated into the crystalline phase. The width of the diffraction peaks indicates that the crystals are about 120 Å in diameter. Crystal sizes in the range of about 20 Å to 200 Å are acceptable. FIG. 3 shows a transmission electron micrograph (200,000×) of an exemplary composition (Table II, e.g. 5) that was heat treated at 600° C. for 48 hours, showing the fine $LaF_3$ crystallites. The crystallite size of 120 Å is in agreement with the X-ray diffraction data in FIG. 1(b). The fine periodic array of crystals, as shown in FIG. 3, is responsible for the excellent transparency of the glass-ceramic composition. The crystal spacing is preferably about 50 Å to 300 Å. Samples with fewer crystals of the same size are hazy due to larger spacing between crystals and increased scattering. The hexagonal (Tysonite) crystal structure is the most stable for the larger rare earth trifluorides (La . . . Sm), while an orthorhombic structure is the most stable for the smaller rare earth trifluorides (Eu . . . Lu); the hexagonal versions of these crystals are either unknown or only exist as high temperature polymorphs. These novel phases, however, can be formed by using the same heat treatment of the appropriate composition described in this patent. For example, hexagonal $GdF_3$, $TbF_3$, and $YF_3$ can be made by heat treating exemplary compositions (Table II, e.g.'s 13, 14 and 16), respectively, at 650° C. for four hours. Extensive solid solutions of mixed rare earth trifluoride crystals can also be made by this technique to tailor appropriate properties. FIG. 1(c) shows the diffraction pattern of an exemplary composition (Table II, e.g. 13) upon heat treatment at 650° C. for four hours, and shows peaks indicative of hexagonal $GdF_3$ crystals.

Because the host crystal is itself a rare earth fluoride, the optically active rare earth dopants are homogeneously distributed throughout the crystal lattice, resulting in higher rare earth dopant concentrations without the problematic clustering typically seen with high rare earth concentrations in other glass ceramic, fluoride, or silica-based glass compositions. FIG. 2(a) shows the $Eu^{3+}$ fluorescence from a non-heat treated exemplary glass compositions (Table II, e.g. 3) while FIG. 2(b) shows the $Eu^{3+}$ fluorescence from the same glass after it was heat treated at 650° C. The shorter wavelength peaks of $Eu^{3+}$ which are absent in the untreated glass are indicative of unclustered $Eu^{3+}$ in a fluoride environment. Thus, rare earth ions other than the host crystal can be incorporated into the fluoride crystals without detrimental clustering. It is been observed that up to $1.71 \times 10^{20}$ $Er^{3+}$/cc (1.91 weight %; see Table I, e.g. 3) resulted in no clustering and a fluorescent lifetime of 12 ms for the $^4I_{13/2}$ level.

In the method set forth herein above, a transparent glassy substance having a high rare earth emission efficiency is obtained due to a large amount of fine halide crystals, containing rare earth ions, being precipitated in the glass by the heat treatment described. Since a large amount of the fine crystals precipitated in the resulting glass ceramic have sizes smaller than the wavelength of light, scattering of visible light is sufficiently absent to render the glass transparent before and after the heat treatment, although differing in structure.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

I claim:

1. A transparent oxyfluoride glass-ceramic composition including an amorphous component and a crystal component, comprising:

an oxide component;
a rare earth component;
a halide component; and
a substantially pure rare earth-halide crystal component in the form $REF_3$.

2. The composition of claim 1 wherein the rare earth-halide crystal component comprises a substantially periodic array of crystals each of which has a diameter in the range of 20 Å to 200 Å.

3. The composition of claim 2 wherein the rare earth-halide crystals have a spacing of between 5 Å to 300 Å.

4. The composition of claim 1 wherein the rare earth-halide crystal component comprises a substantially periodic array of crystals each of which has a diameter of about 120 Å.

5. The composition of claim 1 comprising up to 35 mole % of the rare earth-halide crystal as $REF_3$.

6. The composition of claim 1 wherein the rare earth-halide crystal is an hexagonal trifluoride.

7. The composition of claim 1 wherein the rare earth-halide crystal is of the form $REF_3$ where RE is a trivalent rare earth element selected from the group consisting of $Y^{3+}$, $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, and a combination thereof.

8. The composition of claim 1 wherein the oxide component is an alkali-aluminosilicate glass composition.

9. The composition of claim 1 wherein at least some of the rare earth component is partitioned into the crystal component.

10. A transparent oxyfluoride glass composition, comprising (in respective mole % amounts):

| | |
|---|---|
| $SiO_2$ | (0–80); |
| $GeO_2$ | (0–80); |
| $Na_2O$ | (0–25); |
| $K_2O$ | (0–25); |
| $Rb_2O$ | (0–25); |
| $Cs_2O$ | (0–25); |
| $Al_2O_3$ | (0–40); |
| $Ga_2O_3$ | (0–40); |
| $RE_2F_6$ | (0 < $RE_2F_6$ < 18); |
| PbO | (0–15); |
| RO | (0–25); |
| ZnO | (0–10); |
| $ZrO_2$ | (0–2); |
| $TiO_2$ | (0–2); |
| $Nb_2O_5$ | (0–10); |
| $Ta_2O_5$ | (0–10); |
| $P_2O_5$ | (0–5); |
| $B_2O_3$ | (0–15); |
| $As_2O_3$ | (0–10); |
| $Sb_2O_3$ | (0–10); and |
| $XCl_n$ | (0–5), | where RO is at least one of BaO, CaO, SnO and MgO;
$XCl_n$ is a chlorine containing component selected from the group consisting of NaCl, $LaCl_3$, $AlCl_3$, and $NH_4Cl$; with
$(SiO_2+GeO_2)$: (40–80);
$(Na_2O+K_2O+Rb_2O+Cs_2O)$: (2–25); and
$(Al_2O_3+Ga_2O_3)$: (10–40),
where RE is selected from the group consisting of $Y^{3+}$, $Ce^{3+}$, $Pr^{3+}$, $Nd^{3+}$, $Sm^{3+}$, $Eu^{3+}$, $Gd^{3+}$, $La^{3+}$, $Er^{3+}$, $Tb^{3+}$, $Dy^{3+}$, $Ho^{3+}$, $Tm^{3+}$, $Yb^{3+}$, $Lu^{3+}$, and a combination thereof.

11. The composition of claim 10 where the amount of $RE_2F_6$ is selected according to the formula $RE_2F_6=(K')(R'/r)^3 (Al_2O_3+Ga_2O_3-R_2O)/2$, where R is one of Na, K, Rb and Cs; $0.7 \leq K' \leq 1.2$; R' is the radius of $La^{3+}$; and r is the radius of $RE^{3+}$.

12. The composition of claim 10 where

| | |
|---|---|
| $SiO_2$ | (40–80); |
| $GeO_2$ | (0–20); |
| $Na_2O$ | (5–14); |
| $K_2O$ | (0–14); |
| $Rb_2O$ | (0–14); |
| $Cs_2O$ | (0–14); |
| $Al_2O_3$ | (15–30); |
| $Ga_2O_3$ | (0–15); |
| $RE_2F_6$ | (2–12); |

13. A process for making the transparent oxyfluoride glass-ceramic of claim 1, said transparent glass-ceramic having the following composition (in respective mole % amounts):

| | |
|---|---|
| $SiO_2$ | (0–80); |
| $GeO_2$ | (0–80); |
| $Na_2O$ | (0–25); |
| $K_2O$ | (0–25); |
| $Rb_2O$ | (0–25); |
| $Cs_2O$ | (0–25); |
| $Al_2O_3$ | (0–40); |
| $Ga_2O_3$ | (0–40); |
| $RE_2F_6$ | (0 < $RE_2F_6$ < 18); |
| PbO | (0–15); |
| RO | (0–25); |
| ZnO | (0–10); |
| $ZrO_2$ | (0–2); |
| $TiO_2$ | (0–2); |
| $Nb_2O_5$ | (0–10); |
| $Ta_2O_5$ | (0–10); |
| $P_2O_5$ | (0–5); |
| $B_2O_3$ | (0–15); |
| $As_2O_3$ | (0–10); |
| $Sb_2O_3$ | (0–10); and |
| $XCl_n$ | (0–5), | where RO is at least one of BaO, CaO, SnO and MgO;
$XCl_n$ is a chlorine containing component selected from the group consisting of NaCl, $LaCl_3$, $AlCl_3$, and $NH_4Cl$; with
$(SiO_2+GeO_2)$: (40–80);
$(Na_2O+K_2O+Rb_2O+Cs_2O)$: (2–25); and
$(Al_2O_3+Ga_2O_3)$: (10–40),
where RE is selected from the group consisting of of $Y^{3+}$, $Ce^{3+}$, $Pr^{3+}$, $Nd^{3+}$, $Sm^{3+}$, $Eu^{3+}$, $Gd^{3+}$, $La^{3+}$, $Er^{3+}$, $Tb^{3+}$, $Dy^{3+}$, $Ho^{3+}$, $Tm^{3+}$, $Yb^{3+}$, $Lu^{3+}$, and a combination thereof comprising the steps of:

a) combining mixable forms of each component of said composition to form a mixture thereof;
b) charging said mixture into a crucible;
c) melting said mixture to form a melt;
d) promoting homogenization of said melt;
e) casting said melt into a mold to form a glass in a vitreous state;
f) heat treating the glass to promote formation of the rare earth fluoride crystals.

14. The process of claim 13 wherein step (f) comprises heating the glass at a temperature of between 600–800° C. for a time of between 1–48 hours.

15. The process of claim 14 comprising a temperature between 675–725° C. and a time between 3–4 hours.

* * * * *